July 12, 1927.
F. KRISCH
1,635,331
HYDRAULIC BRAKE MECHANISM
Filed Sept. 21, 1925
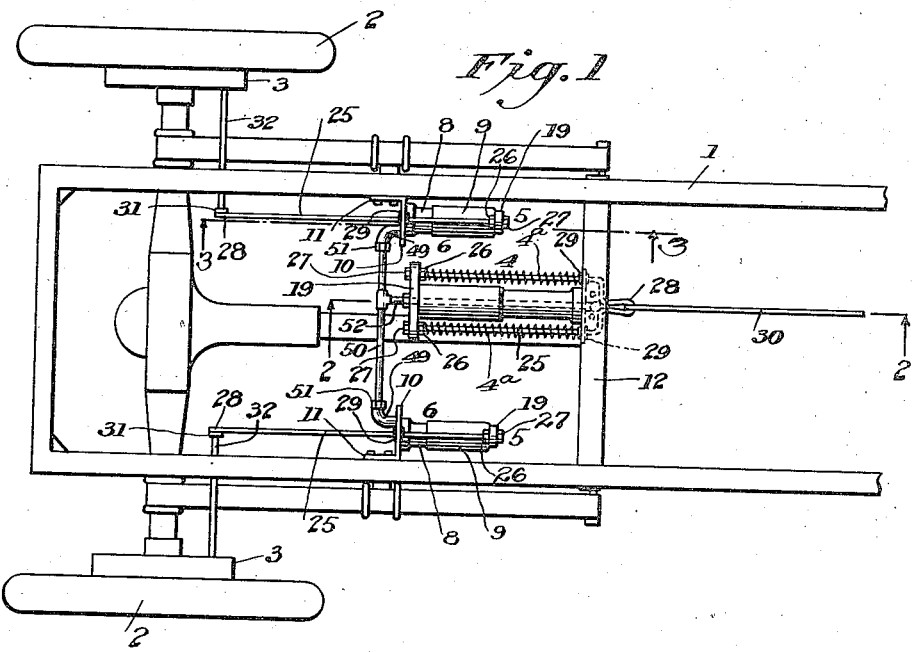
Inventor:
Frank Krisch,
By A.B.Bowman
Attorney.

Patented July 12, 1927.

1,635,331

UNITED STATES PATENT OFFICE.

FRANK KRISCH, OF LOS ANGELES, CALIFORNIA.

HYDRAULIC BRAKE MECHANISM.

Application filed September 21, 1925. Serial No. 57,612.

My invention relates to hydraulic brake mechanism for automobiles, and the general object thereof is to provide a brake mechanism of this type by means of which equal pressures will be applied to all brakes.

Another object is to provide a simple, powerful and efficient brake mechanism of the character stated which may be easily installed on an automobile or removed for repairs, etc.

Other objects and advantages will appear hereinafter.

My invention is illustrated in the accompanying drawing which forms a part of this specification, and in which Fig. 1 is a fragmentary plan view of an automobile without its body showing my hydraulic brake mechanism installed thereon and omitting some of the minor details to facilitate the illustration.

Fig. 2 is a vertical longitudinal section on an enlarged scale of one unit of my brake taken on line 2—2 of Fig. 1.

And Fig. 3 is a longitudinal section view on an enlarged scale of one of the units for directly actuating one of the brakes, the view being taken on the line 3—3 of Fig. 1.

Similar reference characters designate the same parts in both figures.

In the drawing 1 indicates the chassis, 2, the rear wheels, and 3, the conventional drum brakes on the inside of said wheels.

My hydraulic brake mechanism for two wheel brakes as shown includes a primary hydraulic operating unit 4 and two secondary hydraulic operated units 5, which units are mounted on the automobile chassis 1.

Each unit 5 and the unit 4 includes a cylinder 6 and a piston 7, the cylinder being made in two telescopic sections 8 and 9 with the section 8 telescoping within the section 9. The cylinder 6 of unit 4 is twice the capacity of the cylinders of units 5 for two wheel brakes, and four times the capacity for four wheel brakes. On the outer end of the section 8 is formed a head 10 and a bracket 11. The bracket 11 of unit 4 is secured to the under side of a cross bar 12 of the chassis 1 by screws 13 and nuts 14, whereby said unit is mounted on the chassis. The brackets 11 of the units 5 are secured by screws 13 and nuts 14 to the inside of the side members of the chassis, whereby said units are mounted on the chassis. The piston 7 of each unit 5 and the unit 4, as shown respectively in Figs. 2 and 3 is secured on the inner end of a piston rod 15 which projects through an opening 16 in the closed outer end 17 of the section 9 of the unit and through an opening 18 in a cross bar 19, and the outer end portion of said rod is threaded as at 20 to be engaged by nuts 21, 22 and 23. The nut 21 engages the inner side of the end wall 17 of cylinder section 9 and the nut 22 engages and locks the nut 21 on the rod 15, while the nut 23 engages the outer side of the cross bar 19 and holds the bar firmly against the cylinder end 17 and the piston rod 15 and piston 7 properly in position in the cylinder 6 of unit 4. The ends of a yoke 25 extend through the ends of the cross bar 19 of the unit 4 and each unit 5, and the ends of said yoke are threaded to receive nuts 26 and 27, the nuts 26 engaging the inner side of the bar 19 and the nuts 27 engaging the outer side of said bar whereby the ends of the yoke are secured to the ends of said bar. The yoke 25 of each unit extends longitudinally over the cylinder 6 of the unit and around the head 10 thereof and is formed with a loop 28 in its outer end beyond the cylinder. In the head 10 of the cylinder 6 of each unit 5 and the unit 4 are formed a pair of bearings 29 through which slide the side members of the yokes 25.

The loop 28 of the yoke 25 of unit 4 is connected to the link 30 which connects to the brake lever of the automobile (not shown). The loops 28 of the yokes of units 5 are connected to arms 31 on the cam shafts 32 of the wheel drum brakes 3.

The piston 7 comprises a metal disk 33, two cup shaped leather packings 34 and 35, two packing nuts 36 and 37 and a lock nut 38, the inner end portion of the piston rod 15 being threaded as at 39 to be engaged by said nuts. The disk 33 and packings 34 and 35 are apertured to fit on the piston rod and the nuts 37 and 38 screw on the thread 39 against the packings and hold the packings against the disk 33 and the nut 36 holds the piston on the piston rod with the nut 37 against the lock nut 38. The packing nuts 36 and 37 have annular grooves 40 and 41 therein in which grooves are fitted split expansible rings 42 and 43 which engage the inside of the packings 34 and 35 and hold the same against the interior of the cylinder section 8 thus preventing leakage in the cylinder past the piston.

On the inner end of the cylinder section 9 of each unit is formed an external bead 45, over which extends one end of a flexible leather sleeve 46 which sleeve extends beyond said inner end of said section over the exposed portion of the section 8 of the cylinder. The sleeve is clamped at one end behind the bead 45 onto the cylinder section 9 by a ring clamp 47, while the other end of said sleeve is clamped by a ring clamp 48 on the cylinder section 8. The sleeve contracts and expands to allow for the telescopic movement of the cylinder sections 8 and 9 during the reciprocation of the piston 7 and the sleeve prevents dirt and grit from entering the cylinder 6.

A nipple 49 is tapped through the head 10 of the unit 4 and each unit 5. The nipples 49 of the units 5 are connected to the ends respectively of a pipe 50 by couplings 51, which pipe is connected midway between its ends to the rear end of a pipe 52, the forward end of the pipe 52 being connected to the nipple 49 of unit 4 by the coupling 51 of the nipple.

Liquid is placed in the cylinder section 8 of the unit 4 and each unit 5, forwardly of the piston 7, and when the piston 7 of unit 4 is pulled forwardly by the brake lever, through link 30, yoke 25, bar 19 and piston rod 15, the liquid is forced out of the cylinder of the unit 4 through its nipple 49, pipes 52 and 50 and nipples 49 of units 5 into the cylinder section 8 of units 5, whereupon the pistons 7, rods 15, and yokes 25 of said latter units are forced rearwardly by said liquid, and the arms 31 and shafts 32 are swung in the same direction, whereby the brakes 3 are applied to the wheels 2. The brake springs restore the units 5 to their normal position when the brake lever is released, while the brake unit 4 is provided with springs 4ª mounted on the rods of the yoke 25 which tend to return the pistons and cylinder to inoperative position.

I claim:

1. In a hydraulic brake mechanism for automobiles, a hydraulic unit comprising a cylinder made in two telescopic hollow sections, the head of the outer section enclosing the inner end of the inner section, a piston reciprocally mounted in the inner section, a piston rod connecting said piston with the head of the outer section, a cross member secured to the head of the outer section, a yoke secured to said cross member and extending around the head end of said inner section, and means for operating said yoke.

2. In a hydraulic brake mechanism for automobiles, a hydraulic unit comprising a cylinder made in two telescopic hollow sections, the head of the outer section enclosing the inner end of the inner section, a piston reciprocally mounted in the inner section, a piston rod connecting said piston with the head of the outer section, a cross member secured to the head of the outer section, a yoke secured to said cross member and extending around the head end of said inner section, means for supporting the head end of the inner section and for guiding the adjacent portion of said yoke, spring means in connection with said yoke between said cross member and said last mentioned means for normally separating the sections of said cylinder, and means in connection with said yoke for contracting said sections relative to each other.

In testimony whereof, I have hereunto set my hand at Los Angeles, California, this 15th day of September, 1925.

FRANK KRISCH.